Jan. 13, 1959     J. DOLZA     2,868,181
COMBUSTION CHAMBER FOR INTERNAL COMBUSTION ENGINE
Filed June 25, 1956
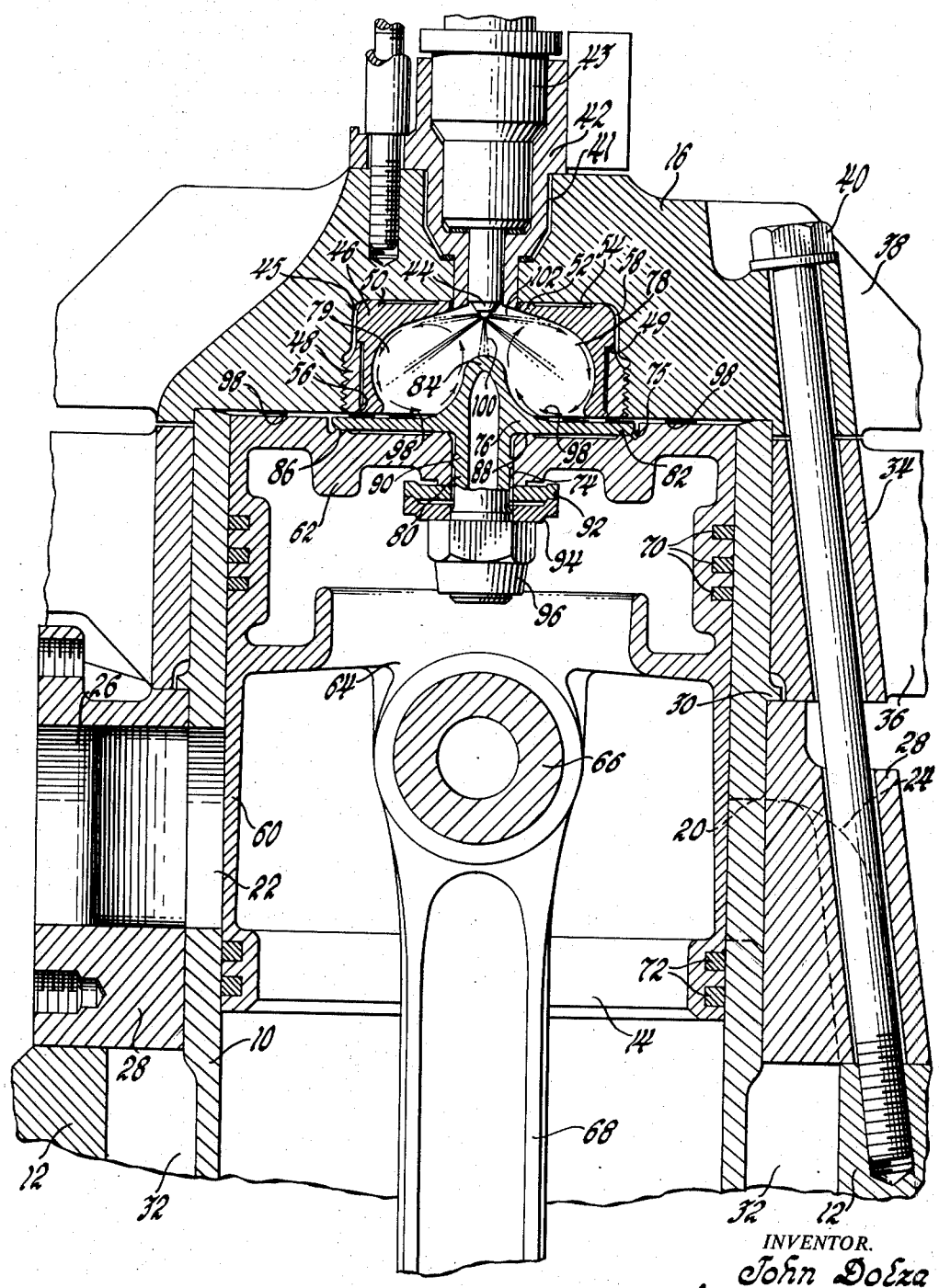
INVENTOR.
John Dolza
BY
J. C. Thorpe
ATTORNEY

2,868,181
COMBUSTION CHAMBER FOR INTERNAL COMBUSTION ENGINE

John Dolza, Davisburg, Mich., assignor to General Motors Corporation, Detroit, Mich., a corporation of Delaware Application June 25, 1956, Serial No. 593,466

17 Claims. (Cl. 123—32)

This invention relates to an internal combustion engine and, more particularly, to an internal combustion engine of the compression ignition, liquid fuel injection type adapted to utilize a multiplicity of fuels of differing firing characteristics.

Among the principal objects of the invention are to provide such an engine with means including an improved combustion chamber adapted to increase the thermal efficiency of the engine operating cycle and thereby improve the fuel economy of the engine; to improve the firing regularity in the individual engine cylinders and to reduce the ignition delay after fuel injection by providing high temperature combustion chamber surfaces facilitating the vaporization and ignition of the fuel spray; to permit compression ignition operation over a wide range of compression ratios; to permit compression ignition operation at relatively low compression ratios which will permit of the use of a relatively low pressure injection system; to reduce the general noise characteristics of the engine; to reduce the cetane fuel requirements of the engine; and to reduce the external cooling requirements of the engine by reducing the heat transfer through the cylinder and piston to the cooling mediae.

The combined means for accomplishing the foregoing and other objects, advantages and features of the invention will be more thoroughly understood from the following description of a preferred embodiment thereof having reference to the attached drawing showing a longitudinal sectional view of an engine cylinder embodying the invention.

More particularly, the drawing shows a cylinder assembly for a loop-scavenged, two-cycle, air-cooled, combustion-ignition, fuel-injection internal combustion engine. The cylinder assembly includes a cylinder sleeve 10, the lower end of which is suitably mounted in a crankcase 12. The sleeve reciprocably mounts a piston 14 and is closed at its upper end by a cylinder head 16 to form an expansible chamber therebetween. The sleeve 10 is provided with a plurality of scavenging and charging air inlet ports 20 and a plurality of exhaust ports 22 formed on opposite sides of the cylinder in a circumferential belt intermediate its ends. The ports 20 and 22 are controllable by the reciprocation of the piston 14 and mate with air and exhaust passages 24 and 26, respectively, which are provided in an annular muff 28 interposed between an annular boss 30 formed circumferentially of the cylinder barrel and the crankcase 12. The air inlet passages 24 are connectible through air box passages 32 provided in the crankcase to an engine driven or exhaust turbine driven compressor, not shown. The upper end of the cylinder barrel above the muff 28 is embraced with heat conducting contact therebetween by an annular cooling muff 34 having a plurality of cooling fins 36 thereon.

The cylinder head 16 is provided with a plurality of cooling fins 38 and is secured in pressure sealing relation with the upper end face of the cylinder sleeve by a plurality of radially-spaced stud bolts 40. The bolts 40 extend between the crankcase and the cylinder head and are inclined radially inwardly toward the cylinder head and toward the axis of the piston and the cylinder. The cylinder head has a central bore and counterbore indicated at 41 which are concentric with the cylinder axis and serve to mount a fuel injector seating assembly 42 which in turn mounts a fuel injector 43. The injector has a multiple hole nozzle tip 44 which projects axially into a cylindrical recess 45 formed in the cylinder head. The recess 45 opens axially on the expansible chamber formed between the piston and cylinder head and mounts a cup-shaped insert 46 of a highly heat and oxidization resistent material, such as GMR 235 alloy. The insert 46 is retained in the recess 45 by an annular ring 48 which threadably engages the side walls of the recess and has an annular end surface thereon in sliding engagement with an annular radially extending shoulder 49 formed circumferentially of the insert.

The base portion of the insert 46 is centrally perforated to embrace the injector seating member and the injector nozzle tip and is provided with two radially-spaced annular lands 50 and 52 which are formed by an annular recess 54 formed on its upper surface. A third annular land or boss 56 is formed circumferentially of the insert adjacent its lower or lip end. The lands 50, 52 and the land 56 contact the base of the recess 45 and the inner surface of the retaining ring, respectively; provide heat transfer barriers between the insert, the head, and the ring in the form of intermediate heat insulating air pockets; and limit the heat conducting contact between the insert and the cylinder head and between the insert and the retaining ring, respectively. Intermediate the shoulder 49 and the land 50, the insert 46 is provided with a circumferential surface 58 which is radially expansible into heat conducting contact with the side wall of the cylinder head recess when the insert has reached a predetermined temperature. Control of the insert temperature is thus accomplished by proportioning the radial clearance between the surface 58 and the side wall of the recess 45 and the axial length of the surface 58 so that heat is transferred from the cylinder head insert to the head by the physical contact of these surfaces at temperatures which are consistent with the maximum insert and head temperatures desired. The temperature at which such contact occurs is determined by the relative expansion between the insert and the head and the radial clearance existing therebetween at the time and temperature of assembly. Flexure of the portion of the insert between the shoulder 49 and the land 56 accommodates such expansion and maintains the land 56 in pressure sealing contact with the retaining ring.

The piston 14 includes a skirt portion 60, a head or crown portion 62 and a wrist pin carrier portion 64 and is connectible through a wrist pin 66 and a connecting rod 68 to the engine crankshaft, not shown. A plurality of axially-spaced compression and oil control rings 70 and 72, respectively, are mounted in circumferential grooves provided therefor in the piston skirt. The crown of the piston is perforated by a bore 74, which is concentric with the axis of the piston, and has a counterbore 75 opening toward the cylinder head. A piston head insert 76 of a material having high heat and oxidization resistance is mounted in the bore and counterbore and is of a configuration to cooperate with the cup-shaped cylinder head insert 46 to form a main combustion chamber 78 of the so-called semi-turbulent open toroidal type.

The piston head insert 76 includes a hollow shank portion 80 projecting through the bore 74; a flange portion 82 extending radially outwardly in the counterbore and having a relatively flat upper surface which is substantially co-extensive with the annular surface of the piston top surrounding the counterbore; and a hollow nipple portion 84 extending axially upwardly into the chamber formed by the cup-shaped cylinder head insert 46. The bottom of the counterbore 76 is annularly recessed to provide two annular lands 86 and 88 which contact the underside of the insert flange portion 82 which is preferably of a diameter greater than that of the piston-facing opening of the cylinder head insert 46. The hollow shank portion 80 of the insert is provided with an annular heat conducting boss 90 which slidably engages the bore 74 and locates the insert axially of the piston. A nut 96 is threaded on the projecting end of the hollow shank portion 80 and two dish-shaped spring washers 92 and 94 interposed between the underside of the piston crown and the nut 96 serve to bias the insert into pressure sealing and heat conducting contact with the lands 86 and 88. As in the case of the cylinder head insert 46, the equilibrium temperature of the piston insert will be higher than the temperature of the piston crown because heat transfer from the piston insert is minimized by isolating it from the piston crown by means of the narrow lands 86 and 88 and the boss 90, and using the dead air space therebetween as an insulating or thermal barrier.

In operation the inserts 46 and 76 are maintained at a relatively high temperature by their exposure to the combustion which occurs within the chamber 78 while the heat losses from the inserts are minimized by the heat transfer barriers interposed between the inserts and the mounting head or piston crown. As the piston 14 approaches the cylinder head 16 during its compression stroke, the portion of the air charge between the approaching outer annular faces of the piston and cylinder head proper is squished radially inwardly at a relatively high velocity and is deflected upwardly by the curved upwardly extending nipple portion 84 of the piston insert, as shown by arrows 98, to establish a substantially toroidal flow of the air charge within the combustion chamber 78. Just before the piston reaches its uppermost position, as shown in the drawing, the injector 43 is actuated by suitable means, not shown, to inject fuel within the combustion chamber. Preferably, the multiple tip injector nozle 44 has at least one hole directing a relatively small portion of the fuel charge axially of the combustion chamber, as indicated at 100, and onto the relatively hot upper surface of the nipple portion 84. The remainder of the fuel is dispersed radially outwardly through a plurality of holes toward the relatively hot surfaces of the cylinder head insert as indicated at 102.

As the fuel charge is dispersed through the toroidally moving compressed air charge, a portion thereof is vaporized due to the temperature and movement of the air charge while the remainder is first deposited in liquid form on the relatively hot combustion chamber surfaces of the inserts 46 and 76 from which it is almost instantaneously vaporized by the heat of the insert and the movement of the air charge and ignited. As the axially directed portion of the fuel charge 100 reaches the surface of the nipple portion 84 substantially before the remainder of the fuel reaches the surfaces of the head insert, this portion of the fuel is ignited first and serves to pilot the relatively smooth combustion of the remainder of the fuel charge as it is vaporized. Thus ignition of the fuel spray is initiated at the beginning of the injection period. This reduction in ignition delay improves the firing regularity in the individual cylinders and reduces the general noise characteristics of the engine. The use of the relatively hot combustion chamber inserts also isolates the main combustion of the fuel charge from the less heat and oxidation resistant material of the cylinder head and piston proper thus permitting the use of aluminum or similar material and reducing the necessary cooling requirements for these elements; insures the compression ignition of the fuel charge over a wide range or compression ratios; and reduces the cetane fuel requirements of the engine.

While the foregoing description and the single figure of the drawing have been confined to one illustrative embodiment utilizing the several features of the invention, it will be apparent to those skilled in the art that certain of these features may be used severally and that various modifications can be made without departing from the spirit and scope of the invention, as defined in the following claims.

I claim:

1. A combustion chamber for an internal combustion engine including a housing member having cooling means associated therewith, a member of a highly heat resistant material mounted in said housing member and defining a portion of said combustion chamber, a plurality of lands intermediate said housing member and said heat resistant member defining slip surfaces and limiting the heat conducting contact therebetween, one of said members having a surface thereon of predetermined dimension and spaced clearance with the other of said members on assembly and expansible into heat controlling contact with said other member when the temperature of said one member has reached a predetermined maximum.

2. A combustion chamber including a housing member, a combustion chamber liner of a highly heat resistant material mounted in said housing member and defining at least a portion of said combustion chamber, means intermediate said housing member and said liner for establishing a thermal barrier limiting the heat conduction contact therebetween, said means permitting relative expansion between said liner and said housing member, and said liner having a surface thereon of predetermined dimension and spaced clearance with said housing member on assembly and expansible into heat controlling constact with a surface of said housing member when said liner has reached a predetermined temperature whereby the temperature of said liner is maintained below a maximum allowable temperature.

3. A combustion chamber as defined in claim 2 including a fuel injector mounted by said housing member and projecting into said combustion chamber, said injector being adapted to dispense fuel on the adjacent relatively high temperature surfaces of said liner.

4. A combustion chamber as defined in claim 2 including a fuel injector mounted by said housing member and having a multiple hole nozzle tip projecting into said combustion chamber through said liner, said nozzle tip being adapted to deposit liquid fuel on the adjacent surfaces of said liner, and said liner being maintained at a relatively high controlled temperature by said heat controlling contact between said liner and said housing member whereby the fuel is vaporized from said adjacent surfaces above the self-ignition temperature of said fuel.

5. In an internal combustion engine of the compression ignition type including a cylinder closed at one end and having a piston reciprocably mounted in said cylinder and forming an expansible chamber therewith, said cylinder having a recess in said closed end opening onto said chamber, an insert member of a highly heat resistant material mounted in said recess and defining a portion of a combustion chamber between said cylinder and said piston, means intermediate the opposing surfaces of said cylinder recess and said insert member for establishing a thermal barrier limiting the heat conduction between said cylinder and said insert member, and said insert member having a surface thereon expansible into heat controlling contact with a surface portion of said cylinder recess as said insert reaches a predetermined temperature.

6. In an internal combustion engine as set forth in claim 5, the opposing surfaces of said cylinder insert member and said piston each being of a configuration to form a toroidal open type combustion chamber therebetween as the piston approaches its uppermost position whereby portions of an air charge entrapped between opposed surface portions of the closed end of said cylinder and the piston are squished radially inwardly of the combustion chamber to effect a high velocity toroidal movement within the combustion chamber prior to fuel injection, and a fuel injector mounted by said cylinder head and having a multiple hole nozzle tip projecting into said combustion chamber, said injector being adapted to direct fuel through said nozzle tip toward the adjacent controlled temperature surfaces of said insert member in timed sequence with respect to the reciprocation of said piston.

7. A compression ignition, fuel injection engine comprising, in combination, a cylinder closed at one end and reciprocably mounting a piston to form an expansible chamber therewith, means for introducing an air charge into said expansible chamber, said closed end of said cylinder having a cylindrical recess therein opening toward said chamber, said recess being of a diameter substantially less than that of said cylinder, said recess having a rear wall and side walls, said side walls defining an annular shoulder intermediate their ends, said annular shoulder facing the rear wall of said recess, a cup-shaped insert mounted in said recess and retained therein by said annular shoulder, said annular shoulder slidably engaging a mating annular shoulder formed on said insert, said insert having a plurality of lands limiting the heat conducting contact between said insert and said cylinder and having a circumferential surface thereon of predetermined axial dimension and radially spaced clearance with opposed surfaces on said cylinder on assembly and expansible into heat controlling contact with said cylinder when said insert has reached a predetermined temperature, said piston having a nipple portion adapted to project axially into said cup-shaped member as said piston approaches said closed end, and said cup-shaped insert and said piston coacting to form a toroidal bowl type combustion chamber therebetween whereby a portion of an air charge entrapped between the opposed outer surface portions of the closed end of said cylinder and the piston as the piston approaches its uppermost position is squished radially inwardly of the cylinder where it is deflected axially by said nipple portion into said combustion chamber thereby effecting a high velocity toroidal movement within the combustion chamber prior to fuel injection, and a fuel injector mounted by said cylinder and having a multiple hole nozzle tip projecting into said combustion chamber through said insert, said nozzle tip being adapted to direct fuel into said combustion chamber and onto the adjacent surfaces of said insert in timed relation with the reciprocation of said piston, said insert being maintained at a relatively high temperature by its exposure to the combustion occurring in said combustion chamber and its limited heat conducting contact with said cylinder.

8. In an internal combustion engine of the fuel-injection, compression ignition type, the combination including a cylinder member having a bore therein closed at one end and reciprocably mounting a piston to form an expansible chamber therewith, said cylinder member having a bowl-shaped recess in said closed end opening onto said chamber, said bowl-shaped recess being of a diameter less than said cylinder bore, said piston having a boss extending axially into said bowl-shaped recess as said piston approaches said closed end at one end of its reciprocation, means associated with said boss for limiting the head conduction therefrom whereby said boss is maintained at a substantially higher temperature relative to the temperature of the adjacent surfaces of said piston, said recess and said piston coacting to form a toroidal type combustion chamber therebetween as the piston approaches said closed end whereby a portion of an air charge entrapped between the opposed surface portions of the cylinder end and the piston is squished radially inwardly of the cylinder into said combustion chamber where it is deflected axially by said boss to effect a high velocity toroidal movement within the combustion chamber prior to fuel injection, and a fuel injector mounted in said cylinder member and having a multiple hole nozzle tip projecting into said combustion chamber, said nozzle tip being adapted to initially direct a small portion of the total fuel charge toward said high temperature boss and to subsequently direct a larger portion of said fuel charge toward the adjacent surfaces of said cylinder recess whereby combustion is initiated within the chamber by that portion of the fuel charge directed toward said boss.

9. The combination as set forth in claim 8 wherein said boss comprises a member formed severally of said piston and including means for mounting said boss on said piston, and means intermediate said boss and said piston for limiting the heat transfer therebetween.

10. A combustion chamber for a compression ignition internal combustion engine including a cylinder closed at one end and reciprocably mounting a piston to form an expansible chamber therewith and having means associated therewith for sequentially introducing an air charge into said expansible chamber in timed relation with the reciprocation of said piston, said cylinder having a bowl-shaped recess formed in said closed end and opening onto said chamber, said bowl-shaped recess being of a diameter less than that of said cylinder, said piston including a crown portion having a bore therein coaxial with said cylinder recess and having a relatively shallow counterbore facing said cylinder recess, an insert of heat resistant material mounted in said bore and counterbore and including a shank portion projecting through said bore, a flange extending radially in said counterbore and having a surface thereon coextensive with an outer annular surface on said piston, and a nipple-shaped boss portion adapted to project axially into said bowl-shaped recess as the piston approaches said closed end of said cylinder, means including a plurality of spaced annular bosses for limiting the heat conducting contact between said insert and said piston, said recess and said piston coacting to form a toroidal type combustion chamber therebetween as the piston approaches said closed end whereby portions of an air charge entrapped between the opposed outer surface portions of the cylinder end and the piston are squished radially inwardly at a relatively high velocity and are deflected axially into said combustion chamber by said nipple-shaped boss portion to effect a high velocity toroidal movement within the combustion chamber prior to fuel injection, and a fuel injector mounted by said cylinder head and having a multiple hole nozzle tip projecting into said combustion chamber, said nozzle tip being adapted to initially deposit a small portion of the total fuel charge on the adjacent end of said nipple-shaped boss portion, said boss portion being maintained at a relatively high temperature capable of rapidly vaporizing and causing the ignition of such portion by the exposure of said insert to the combustion occurring within said combustion chamber and the limited heat conducting contact between said insert and said piston, and said nozzle tip being adapted to subsequently deposit a larger portion of the fuel charge on the surfaces of said recess.

11. In an internal combustion engine of the compression ignition type, the combination including a cylinder barrel closed at one end by a cylinder head, said cylinder head having a cylindrical recess therein opening into said cylinder barrel, a combustion chamber insert member of a highly heat resistant material lining said cylinder head recess and retained therein by an annular ring engaging the side walls of said recess, said ring providing a slip surface with an annular surface formed on said insert member in a plane normal to the axis of said recess, means intermediate said cylinder head insert member and said head and including a plurality of lands for limiting the heat conducting contact therebetween, said insert member having a circumferential surface thereon of predetermined axial dimension and radial clearance with the side wall of said recess on assembly and expansible into heat conducting controlling contact when the temperature of said insert member has reached a predetermined amount whereby the temperature of said insert member is maintained below a maximum allowable temperature, said insert being maintained at a relatively high temperature by its exposure to the combustion sequentially occurring within the combustion chamber and by the controlled limited heat conducting contact between said insert member and said head.

12. The combination as set forth in claim 11 and including a piston reciprocably mounted in said cylinder barrel and forming an expansible chamber with said closed end, said piston including a crown portion having an axially-extending bore therein coaxial with said cylinder recess and having a relatively shallow counterbore facing said cylinder head, said counterbore being of a diameter exceeding that of said cylinder head recess, and a second combustion chamber insert member of a highly heat resistant material mounted in said bore and said counterbore and including a shank portion projecting through said bore, a flange portion extending radially outwardly in said counterbore and having a surface co-extensive with the outer surface of said piston crown, and a nipple portion adapted to extend into said cylinder head insert member as said piston approaches said head, means intermediate said shank and flange portions and said crown portion for limiting heat conducting contact therebetween, said cylinder head and piston inserts coacting to form a combustion chamber therebetween, said second insert being maintained at a relatively high temperature by its exposure to the combustion sequentially occurring therein and the controlled limited heat conducting contact between said insert member and said piston.

13. The combination as set forth in claim 11 and including a piston reciprocably mounted in said cylinder barrel and forming an expansible chamber with said closed end, said piston including a crown portion having a relatively shallow annular recess facing said cylinder head, said piston recess being of a diameter exceeding that of said cylinder head recess, and a second combustion chamber insert member of a highly heat resistant material mounted in said piston recess and including a flange portion extending radially outwardly in said counterbore and a nipple-shaped portion adapted to extend into said cylinder head insert member as said piston approaches said head, means intermediate said piston insert and said crown for limiting heat conducting contact therebetween, said cylinder head and piston inserts coacting to form a toroidal open type combustion chamber whereby portions of an air charge are entrapped between the opposed outer surface portions of the cylinder head and the piston as the piston approaches its uppermost position and are squished radially inwardly of the combustion chamber at relatively high velocities where it is deflected by the curved surface of said nipple-shaped portion axially into said cylinder head insert member where it establishes a high velocity toroidal movement within the combustion chamber prior to the injection of fuel into said chamber, and a fuel injector mounted on said cylinder head, said injector having a multiple hole nozzle tip projecting into said combustion chamber and being adapted to dispense fuel on the adjacent controlled temperature surfaces of said piston head and said cylinder head inserts.

14. In an internal combustion engine, a cylinder barrel closed at one end by a cylinder head, said cylinder head having a cylindrical recess therein opening into said cylinder barrel, a combustion chamber insert member of a highly heat resistant material mounted in and lining said cylinder head recess, means intermediate said cylinder head insert member and said head for limiting the heat conducting contact therebetween and including a circumferential surface on said insert member of predetermined axial dimension and radial clearance with the side wall of said recess on assembly and expansible into heat conducting controlling contact when the temperature of said insert member has reached a predetermined amount whereby the temperature of said insert member due to the combustion therein is maintained below a maximum allowable temperature.

15. A piston for an internal combustion engine adapted to be reciprocably mounted in an engine cylinder and forming an expansible chamber with a closed end of said cylinder, said piston including a crown portion having an annular recess therein facing the closed end of said cylinder, a piston head insert of a highly heat resistant material mounted in said recess and including a flange portion extending radially outwardly in said recess and a hollow nipple-shaped portion projecting axially from said flange portion, said hollow nipple-shaped portion being adapted to project axially into a combustion chamber recess provided in said head as said piston approaches said closed end, and means intermediate the flange portion of said insert and said crown portion for limiting heat conducting contact therebetween, said insert being maintained at a relatively high temperature by its exposure to combustion in said combustion chamber recess and by the limited heat conducting contact between said insert and said piston and said hollow nipple portion being maintained at a relatively higher temperature than said flange portion due to the limited conduction therebetween.

16. An internal combustion engine including a cylinder barrel closed at one end by a cylinder head having a combustion chamber recess therein opening into said cylinder barrel, a piston reciprocably mounted in said cylinder barrel and forming an expansible chamber with said closed end, said piston including a crown portion having a bore extending axially therethrough and having a relatively shallow counterbore facing said cylinder head recess, a piston head insert of a highly heat resistant material mounted in said bore and said counterbore and including a hollow shank portion projecting through said bore, a flange portion extending radially outwardly in said counterbore and having a surface co-extensive with the outer surface of said piston crown, and a hollow nipple-shaped portion co-extensive of said shaft portion and adapted to project axially into said combustion chamber recess as said piston approaches top dead center and means intermediate said shank and flange portions for limiting their heat transfer with said piston crown, said insert being maintained at a relatively high temperature by its exposure to combustion in said recess and by the limited heat transfer between said insert and said piston.

17. The combination as set forth in claim 16, wherein said combustion chamber recess and said piston insert coact to form a toroidal combustion chamber therebetween whereby a portion of an air charge is entrapped as the piston approaches its top dead center position between the opposed outer surface portions of said closed end and the piston and is squished radially inwardly of the combustion chamber at relatively high velocities and is then deflected by the curved surface of said nipple-shaped portion axially into said cup-shaped member where it establishes a high velocity toroidal movement within the combustion chamber prior to the injection of fuel into said chamber, and a fuel injector mounted on said cylinder and having a multiple hole nozzle tip projecting into said combustion chamber and being adapted to inject fuel into said combustion chamber in timed sequence with the reciprocation of said piston.

References Cited in the file of this patent

UNITED STATES PATENTS

| 1,708,056 | French | Apr. 9, 1929 |
| 1,926,499 | Ricardo | Sept. 12, 1933 |
| 2,033,810 | Bernard | Mar. 10, 1936 |

FOREIGN PATENTS

| 110,462 | Austria | Aug. 25, 1928 |
| 442,340 | Great Britain | Feb. 6, 1936 |
| 590,107 | Great Britain | July 8, 1947 |

UNITED STATES PATENT OFFICE
CERTIFICATE OF CORRECTION

Patent No. 2,868,181                                                January 13, 1959

John Dolza

It is hereby certified that error appears in the printed specification of the above numbered patent requiring correction and that the said Letters Patent should read as corrected below.

Column 3, line 37, for "nozle" read -- nozzle --; column 4, line 29, for "constact" read -- contact --; column 5, line 60, for "head" read -- heat --.

Signed and sealed this 2nd day of June 1959.

(SEAL)
Attest:
KARL H. AXLINE
Attesting Officer

ROBERT C. WATSON
Commissioner of Patents